United States Patent [19]
Privat et al.

[11] Patent Number: 5,630,156
[45] Date of Patent: May 13, 1997

[54] PROCESS FOR PARALLEL OPERATION OF SEVERAL COMPUTATION UNITS, ESPECIALLY IN IMAGE PROCESSING, AND CORRESPONDING ARCHITECTURE

[75] Inventors: Gilles Privat, Meylan; Patricia Planet, Grenoble; Marc Renaudin, Biviers, all of France

[73] Assignee: France Telecom, Paris, France

[21] Appl. No.: 324,945

[22] Filed: Oct. 18, 1994

[30] Foreign Application Priority Data

Oct. 18, 1993 [FR] France .................. 93 12368

[51] Int. Cl.$^6$ .................................................. G06F 15/80
[52] U.S. Cl. ........................................ 395/800; 364/DIG. 1
[58] Field of Search .................................. 395/800, 550, 395/250; 364/133, DIG. 1; 382/303, 304, 307

[56] References Cited

U.S. PATENT DOCUMENTS

| | | | |
|---|---|---|---|
| 4,591,980 | 5/1986 | Huberman | 395/800 |
| 4,835,680 | 5/1989 | Hogg | 395/800 |
| 5,040,214 | 8/1991 | Grossberg | 381/43 |
| 5,065,308 | 11/1991 | Evans | 395/800 |
| 5,093,781 | 3/1992 | Castelaz | 395/800 |
| 5,140,670 | 8/1992 | Chua | 395/24 |
| 5,243,551 | 9/1993 | Knowles | 364/750.5 |
| 5,253,363 | 10/1993 | Hyman | 395/800 |
| 5,305,395 | 4/1994 | Mahoney | 382/27 |

FOREIGN PATENT DOCUMENTS

PCT/GB88/00235  3/1988  WIPO.

OTHER PUBLICATIONS

1989 IEE International Symposium on Circuits and Systems vol. 1, pp. 13–16.
Proceedings of the 1986 International Conference on Parallel Processing pp. 343–350.
Proceedings of the 1986 International Conference on Systems, Man, and Cybernetics pp. 313–318.
Parallel Algorithms & Architectures pp. 169–188.
Microprocessors and Microsystems pp. 403–415 vol. 16, No. 8.

*Primary Examiner*—Eric Coleman
*Attorney, Agent, or Firm*—Robbins, Berliner & Carson, LLP

[57] ABSTRACT

Improved process for parallel operation of several computation units, especially in image processing, and corresponding architecture. Several computation units which are together intended to evaluate in an iterative and cellular manner the convergence values of a plurality of variables associated respectively with the various points of a predetermined grid each variable having to satisfy a prespecified iterative relation between itself and n neighbouring variables associated with n neighbouring grid points (P2–P5), a memory means is assigned per point of the grid, intended to store successively all the values of the variable associated with this grid point, the computation units are apportioned in such a way as to assign every grid point to a computation unit and two distinct computation units to two chosen neighbouring points of the grid, all the computation units are made to operate in parallel and independently of one another, and for each current point of the grid, the computation unit assigned to this current point is made to compute each successive value of the variable associated with this current point on the basis of the value contained in the memory means assigned to the current point and of those available and arising from the memory means assigned to the points neighbouring the current point, irrespective of the iteration levels to which these available values correspond, and the said computation unit is made to store each new value thus computed in the memory means associated with the current point.

36 Claims, 4 Drawing Sheets

PROCESS FOR PARALLEL OPERATION OF SEVERAL COMPUTATION UNITS, ESPECIALLY IN IMAGE PROCESSING, AND CORRESPONDING ARCHITECTURE

BACKGROUND OF THE INVENTION

The invention relates to the mutual operation of several computation units which are together intended to evaluate in an iterative and cellular manner the convergence values of a plurality of variables respectively associated with the various points of a predetermined grid.

The invention applies advantageously but not limitingly to the processing of images, especially television images.

Algorithms of iterative type operating on a predetermined grid are encountered in a very large number of applications, including image processing. They make it possible to perform global processing over the whole of the grid but in a cellular manner, that is to say with local interaction only. Indeed, each variable associated with a point of the grid must satisfy a prespecified iterative relation between itself and only n neighbouring variables associated with n neighbouring grid points. Such iterative and cellular algorithms operating on a predetermined grid so as to culminate in convergence values are of the "relaxation" type according to the nomenclature commonly used by the expert.

Image processing algorithms of iterative and cellular type can thus for example operate on a global image spatially sampled by square grid cells with a neighbourhood of order 1. The prespecified relation to be satisfied by each variable, associated in this instance with each current image pixel, therefore involves five pixels, namely the current pixel at the previous iteration and the four immediate neighbours of this current pixel.

Iterative cellular models lend themselves a priori to a massively parallel implementation of each iteration by allotting an elementary processor of the architecture to each pixel. These processors will therefore together evaluate in an iterative and cellular manner the convergence values of the different variables respectively associated with the various pixels of the gridded image.

Parallel architectures of computation units are known which operate in a manner which is fully synchronous one with respect to another. However, the very large scale implementation of an architecture having to operate in a strictly synchronous fashion poses problems when the clock frequency, which is common to all the computation units, increases. Indeed, the offsets in the clock edges between the various points of the circuit may become non-negligible with respect to the period and hence entail a global slowing down of the operation of the architecture. Thus, it is difficult to use a clock having a frequency of the order of a hundred MHz with a circuit whose size is of the order of a $cm^2$. Furthermore, although the synchronism of the conventional architectures is apparently a solution evident to the expert, it also poses convergence problems. Indeed, it turns out to be preferable not to update interdependent variables simultaneously, and this then leads to the use of a chessboard partition of the image. An architecture of computation units is therefore obtained which no longer operates in a fully parallel manner since only half the computation units are active simultaneously, supposing that one computation unit is assigned to each pixel.

The second solution which offers itself to the expert for the implementation of such cellular iterative algorithms is a fully asynchronous solution. With such a view in mind, and assuming that it is possible to assign one processor per pixel of the image, each processor then functions at its own rate, independently of the others, but must nevertheless, when computing its variable at a given iteration level, use the variables computed by the other processors at appropriate iteration levels bearing in mind the prespecified relations between the different variables. This therefore requires handling of the asynchronism and enquiry/acknowledgement procedures for the dialogue between the various processors and the exchange of the appropriate variables with a view to the correct determination of each variable within each processor. No practical embodiment of such a solution is currently known, especially in the processing of real images with one processor per pixel. Indeed, processors suitable for handling such asynchronism in a fully general manner must be microprocessors having high performance and hence large surface dimensions. In other words, the handling of the asynchronism and of the enquiry/acknowledgement procedures between processors of such an architecture is perceived by the expert to be incompatible with a fine granularity (the granularity corresponding to the number of pixels handled by a computation unit; the finest granularity being the association of one computation unit per pixel).

SUMMARY OF THE INVENTION

The invention aims to remedy these drawbacks of the state of the art.

An aim of the invention is to propose a parallel operation of several computation units which is in particular compatible with fine granularity and which permits a high speed of operation.

The invention therefore proposes firstly a process for effecting a pseudo-asynchronism of operation between several computation units which are together intended to evaluate in an iterative and cellular manner the convergence values of a plurality of variables associated respectively with the various points of a predetermined grid each variable having to satisfy a prespecified iterative relation between itself and n neighbouring variables associated with n neighbouring grid points, according to this process:

a memory means is assigned per point of the grid, intended to store successively all the values of the variable associated with this point, the computation units are apportioned in such a way as to assign every grid point to a computation unit and two distinct computation units to at least two chosen neighbouring points of the grid, all the computation units are made to operate in parallel and independently of one another, and for each current point of the grid, the computation unit assigned to this current point is made to compute each successive value of the variable associated with this current point on the basis of the value contained in the memory means assigned to the current point and of those available and arising from the memory means assigned to the points neighbouring the current point, irrespective of the iteration levels to which these available values correspond, and the said computation unit is made to store each new value thus computed in the memory means associated with the current point.

According to the invention, the term "variable" must be taken within a very wide sense, encompassing in particular one or more components of one or more vectors.

The apportioning of the computation units is such that each grid point is handled by one computation unit.

However, the same computation unit may possibly handle several points. However, the expert readily understands that, since the apportioning of the computation units provides for the assigning of two distinct computation units to at least two chosen neighbouring points of the grid, it therefore necessarily follows that at least one instant in the global evaluation of the convergence values of all the variables, the computation of the successive variables of at least one current point of the grid by the computation unit assigned thereto, requires the use of at least one value available in a memory means assigned to at least one point neighbouring this current point and to which is assigned a computation unit distinct from the one mentioned above.

Now, according to the invention, the iteration level to which this value of neighbouring variable corresponds is no hindrance to the computation of the current variable. In other words, the computation unit processing the current variable will use information transmitted by the neighbouring computation unit when it arrives and when the said computation unit needs it. The expert therefore understands that this may lead to using the same neighbouring value twice if the neighbouring computation unit is too slow or else to using a neighbouring variable whose iteration level is higher than that which would correspond theoretically to the prespecified relation to be satisfied by the variables within each cell.

No causal consistency link is therefore demanded between neighbouring computation units. Additionally, the pseudo-asynchronism of operation of the invention, or operational asynchronism, between the various computation units is manifested through the fact that each computation unit, for example an elementary processor, performs its own tasks without taking into account the neighbouring computation units, especially if the relevant computation unit leads or lags with respect to the others.

If the expression "irrespective of the iteration levels to which these available values correspond" takes its full sense when these available values are evaluated by one or more computation units which are distinct from the one handling of the current point, it remains nonetheless precise even if at least one of these available values is evaluated by the same computation unit as the one assigned to the current variable. Of course, in this case the expert will understand that the iteration level corresponding to the neighbouring variable is, however, not arbitrary since this neighbouring variable and the current variable are handled by the same computation unit.

It should moreover be noted that here the invention quasi-systematically provides for modifying, by virtue of the operational asynchronism, the prespecified relation between the different variables in respect of the iteration levels used, when distinct computation units are involved in computing these different variables. Now, it has been observed that this modification of the said relation would also lead to the obtaining of convergence values for the different variables.

The expert therefore appreciates that such pseudo-asynchronism of operation, or operational asynchronism, quite obviously differs from synchronous operation and also from asynchronous operation in the conventional sense of the term which requires global monitoring to supervise the data exchanges between the various computation units. The pseudo-asynchronism of operation according to the invention dispenses with the use of such global supervision are hence with the use of protocols for exchanges between the various computation units, which are unwieldy and expensive to implement hardware-wise.

Furthermore, in the sense of the present invention, a variable is available if the taking into account of its value by a computation unit does not affect the evaluation processing performed by this computation unit. Thus, so as in particular to preclude a first computation unit from being engaged in updating the corresponding memory means with the new value computed for the variable associated with the current point handled by this first computation unit, at the very moment at which a second computation unit is attempting to read the contents of the memory means assigned to this current point, which might give a random result, there is advantageously provision for the first computation unit to block the second computation unit from taking the new computed value into account when the first computation unit is updating the memory means associated with the current point; the second computation unit then takes into account the old value stored in this memory means.

According to a first mode of implementation of the invention, a different computation unit can be assigned per point per grid.

It is also possible to assign each computation unit to a group of p points of the grid. In this case, within each group of points, the corresponding computation unit advantageously determines the successive values of each point of the group, sequentially in a predetermined order. Nevertheless, all the computation units of the neighbouring groups operate in parallel and in pseudo-asynchronous fashion with respect to this computation unit. Operation which is locally sequential (within each group) but globally parallel is therefore obtained. Such locally sequential globally parallel operation differs from locally parallel and globally sequential operation, known in the state of the art, which provides for the performing in parallel of the computations corresponding to a group of variables followed by the sequential sweeping of the whole of the grid. However, this conventional technique occasions significant input/output problems in respect of architectures with fine granularity. Indeed, the expert is aware that, through the effect of the propagation of erroneous values from the edges of the envisaged partition, the number of variables, whose value at the end of It iterations will be correct, is of the order of $(N-It)^2$ where N denotes the size of the partition, and that a bottleneck then appears which limits the number of successive usages of a variable. Locally sequential globally parallel operation such as provided for in a particular embodiment of the invention makes it possible to circumvent these problems.

In a particular application of the invention in which an image is gridded, for example a television image, each point corresponds to a pixel of the image and the prespecified relation then corresponds to a particular processing of this image, such as for example motion estimation or noise removal.

The subject of the invention is also a pseudo-asynchronous parallel architecture of computation units, which are together intended to evaluate in an iterative and cellular manner the convergence values of a plurality of variables associated respectively with the various points of a predetermined grid, each variable having to satisfy a prespecified iterative relation between itself and n neighbouring variables associated with n neighbouring grid points; such an architecture includes an apportioning of the computation units assigning every point of the grid to a computation unit and two distinct computation units to at least two chosen neighbouring points of the grid; moreover, this architecture comprises a first memory means associated with each current point of the grid, for successively storing all the values of the current variable of the current point, and capable of being connected to the computation unit assigned to this current point, n transfer means, linked respectively to the first n memory means assigned to the n points neighbouring each current point and capable of delivering respectively, to the computation unit assigned to the said current point, n available values derived from those contained in the first n memory means, means for controlling the operation of each computation unit, which are capable of making all the computation units operate in parallel and independently of one another, and processing means incorporated respectively in each computation unit, and capable respectively, on the basis of the value contained in the first memory means of the current point and of the values delivered by the n corresponding transfer means, irrespective of the iteration levels to which these delivered values correspond, of determining a new value for the variable associated with the current point, and of storing this new value in the said first memory means of the current point.

According to one embodiment of the invention, a transfer means linked to a first memory means of a point of the grid to which a first computation unit is assigned, and capable of delivering an available value derived from that contained in this first memory means, to a second computation unit assigned to a neighbouring point and distinct from the first, includes means for blocking of the delivery of the value of the variable being updated by the first computation unit in the first memory means, the transfer means then delivering to the second computation unit the old value stored in the first memory means. The means of blocking are advantageously controlled by a blocking signal generated by the first computation unit and arising from the signal for control of writing of the new computed value to the first memory means.

According to one embodiment of the invention, the transfer means includes a latch memory controlled by the signal for control of reading of the second computation unit, whereas the blocking means include an AND logic gate receiving at input the read control signal and the blocking signal and connected at output to the latch memory.

BRIEF DESCRIPTION OF THE DRAWINGS

Other advantages and characteristics of the invention will emerge on examining the detailed description of non-limiting embodiments and modes of implementation of the invention illustrated in the appended drawings in which.

DESCRIPTION OF THE PREFERRED EMBODIMENT

Figure 1:
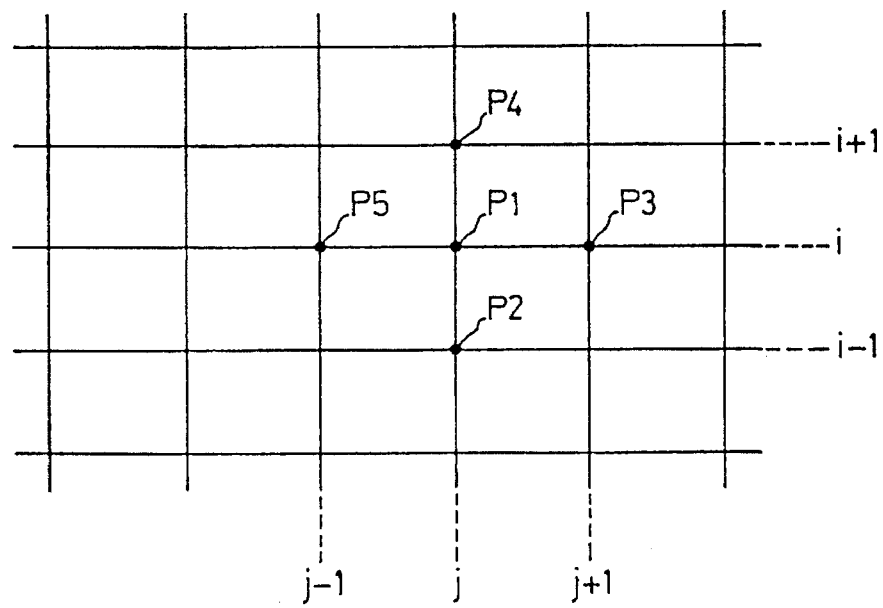
FIG. 1 represents a particular grid of an image.

Although, as mentioned above, the invention is not limited to image processing, it is now assumed that the grid MA illustrated in FIG. 1 corresponds to a grid of an image, such as a television image, spatially sampled with square grid cells. The points P1, P2, P3, P4 and P5 then represent pixels of the image. It is also assumed in this example that the variable associated with each pixel must Satisfy the prespecified iterative relation given in the appendix and corresponding to motion estimation. In this relation, which provides for a neighbourhood of order 1 (that is to say which here brings in five variables respectively associated with a current pixel P1 and with the four neighbouring pixels P2, P3, P4 and P5), the variables associated with a pixel includes the horizontal and vertical components $d_j$ and $d_i$ of the displacement vector of this pixel; k denotes the iteration level, $N_{ij}$ represents the cell of five pixels, $E_i$ and $E_j$ are the components of the spatial gradient of luminance and T denotes an adjustable parameter which may be likened to a temperature.

In the remainder of the text, and for purposes of simplification, all the elements relating to the current pixel with coordinates (i, j) will have labels terminating in the digit 1. Similarly, all the elements relating to the pixel neighbouring the pixel P1, and having coordinates (i–1, j), will have labels terminating in the digit 2. The terminal digit 3 will correspond to the coordinates (i, j+1) and the terminal digits 4 and 5 will correspond respectively to the coordinates i+1, j and i, j–1.

It is now assumed in accordance with a first embodiment of the invention, that there are as many computation units as pixels in the grid, each computation unit being assigned to one pixel.

Figure 2:
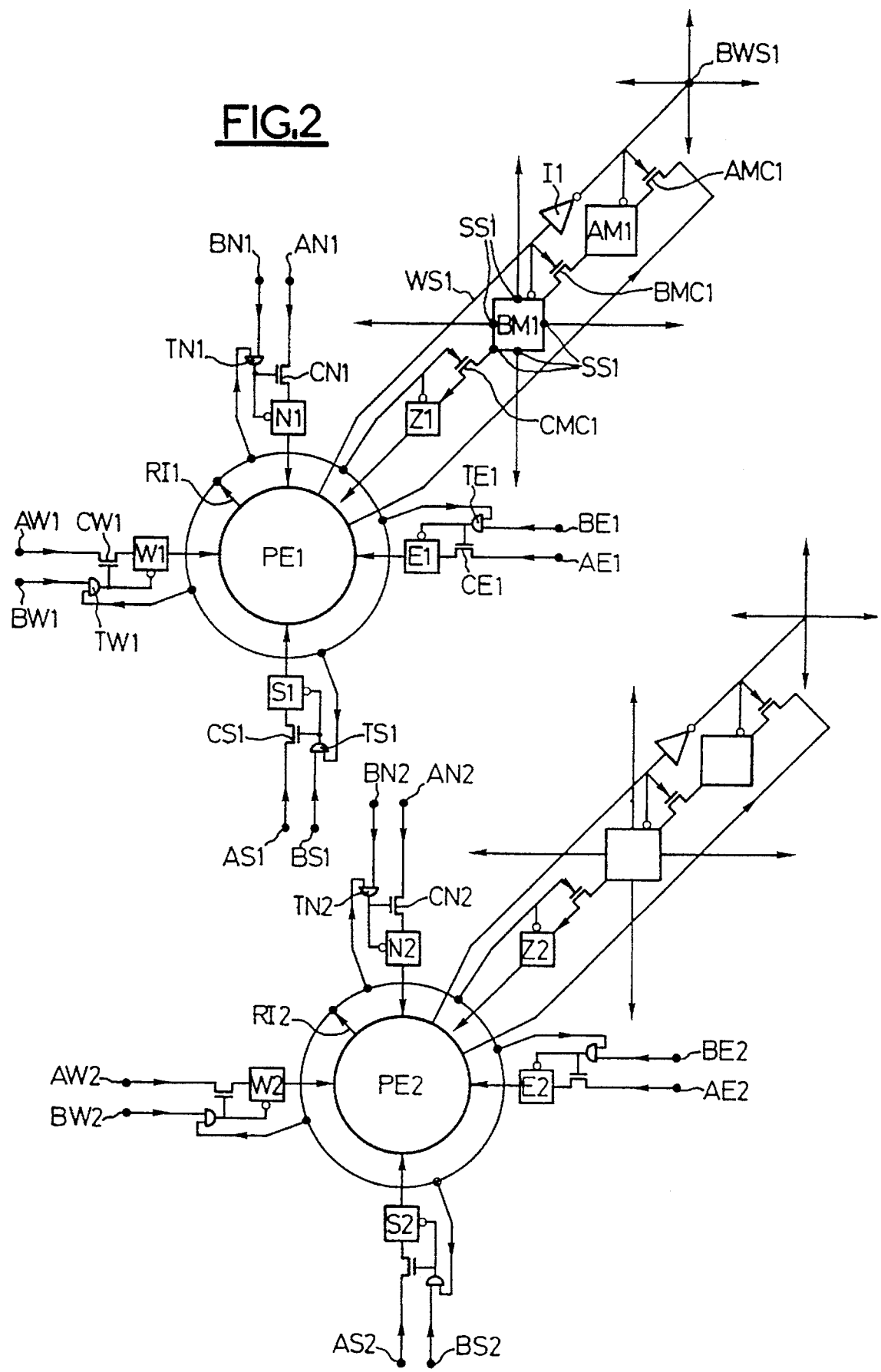
FIG. 2 illustrates diagrammatically two computation units of an architecture according to the invention.

In FIG. 2, for purposes of simplification, only the two computation units PE1 and PE2 have been represented together with their associated means assigned respectively to the pixels P1 and P2. Although in general the term "computation unit" should be interpreted in a very broad sense, possibly encompassing a microprocessor, each computation unit consists here of an elementary processor of fairly low complexity (a few logic elements). Each processor is clocked by is own control means and its own clock, independently of the others. (These means are not illustrated for the purposes of simplification).

The various means associated with the processor PE1 will now be described in detail, given that all the other processors have analogous means.

Figure 4:
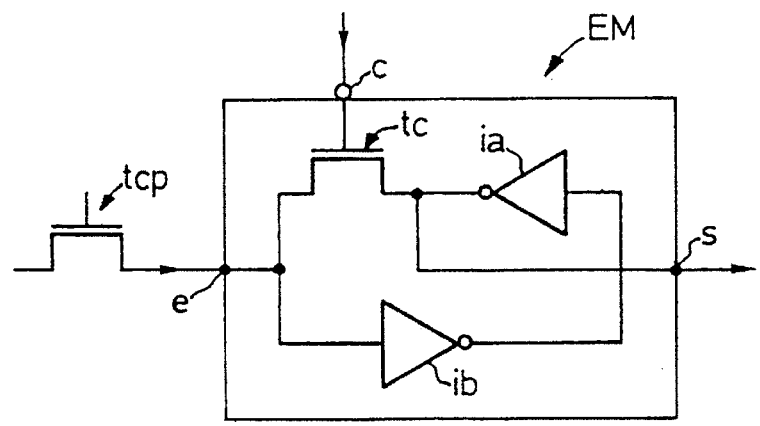
FIG. 4 represents diagrammatically a particular memory element associated with a computation unit.

The processor PE1 is linked to several memory elements labelled N1, E1, S1, W1, Z1, BM1 and AM1, The various memory elements are respectively preceded by controllable switching means CN1, CE1, CS1, CW1, CMC1, BMC1, AMC1, such as for example field-effect transistors. Although it is possible to use various memory-point structures, the one generically labelled EM in FIG. 4 has been used in the present case for all these memory elements. This memory element includes a data input e, a data output s and a control input c. This memory element includes between the input e and the output s two inverters ia and ib which are mutually looped back by way of a controllable switching means tc such as a field-effect transistor. The gate of this field-effect transistor is connected to the inverting control input c. During operation, when the value "1" is present upstream of the control input c, corresponding to a value "0" on the gate of the transistor, the latter is off and it comes on when a bit having the "0" logic level is present upstream of the inverting input c.

When it is associated with the switching means tcp situated upstream of its input e, and controlled complementarily with respect to the switching means tc, the memory element EM behaves like a D-type latch memory. Indeed, when the transistor tcp is on and the transistor tc is off there is a copy (transfer) to the output s of the datum arriving at the input e. By contrast, when the transistor tcp is off and the transistor tc is on, the datum present at the input e, just before the transistor tcp switches off, is stored in the storage loop formed by the two inverters, until the moment at which the transistor tcp comes on again.

These latch memories are those formed by the elements (N1, CN1); (E1, CE1); (S1, CS1); (W1, CW1) and (Z1, CNC1).

When two memory elements EM and their associated transistor tcp are connected up in series, a D master-slave flip-flop is obtained. This is the case with the flip-flop (AMC1, AM1, BMC1, BM1).

The memory means represented here for the purposes of simplification can store just one data bit. In fact, there is provision for several means of this type connected in parallel and associated with data paths when, as is generally the case, the variables include several bits.

Generally, referring more particularly to FIG. 2, the microprocessor PE1 is connected to a first memory means intended for storing successively all the values of the variable computed by the processor PE1, as well as to n (here 4) transfer means intended for delivering successively respectively all the available values of the n variables neighbouring the relevant variable. As will be seen, apart from the fact that each of these transfer means is connected to the processor PE1, they are also connected respectively to the computation units PE2, PE3, PE4, PE5 assigned to the n neighbouring points.

Whereas the transfer means respectively consist of the latch memories (N1, CN1), (E1, CE1), (S1, CS1) and (W1, CW1), the first memory means here includes the D master-slave flip-flop whose input is connected to the processor PE1 and whose output SS1, that is to say the output of the second memory element BM1, is connected to the latch memory (Z1, CMC1). The transistor CMC1 is controlled by a read signal RI1 sent by the processor PE1. This read signal is also connected to the control input of the memory element Z1. Another signal WS1 is able to control the transistor BMC1 and the control input of the memory element BM1, as well as, by way of an inverter I1, the transistor AMC1 and the control input of the memory element AM1. Furthermore, this signal WS1 is distributed, as will be seen in more detail below, to the neighbouring processors, this having been represented diagrammatically by way of a port BWS1 and four arrows.

Similarly, the value contained in the memory element BM1 is intended to be transferred not only to the memory element Z1 but also to the latch memories of the neighbouring processors. Also, although the memory element BM1 has in fact just one output SS1, the latter has been represented five times for the purposes of simplification, the four arrows leaving from four of these ports representing the distributing of the value contained in the memory element BM1 to the neighbouring processors.

Just as all the elements associated with the pixel P1 with coordinates (i, j) have labels terminating in the digit 1, all the elements respectively associated with the four memory means N1, E1, S1 and W1 have labels whose penultimate sign is respectively equal to N, E, S and W. For purposes of simplification, here only the elements associated with the memory means N1 will be described, given that the other memory means E1, S1 and W1 are endowed with analogous means.

Represented upstream of the memory element N1 are two ports BN1 and AN1. The data input of the memory element N1 is connected to the port AN1 by the field-effect transistor CN1. The control (gate) of this transistor CN1 is connected to the output of an AND logic gate, TN1. The output of the AND gate is also connected to the inverting control input of the memory element N1. A first input of the logic gate TN1 is connected to the port BN1 whilst the second input of this logic gate is intended to receive the read signal RI1 sent by the processor PE1.

Figure 3:
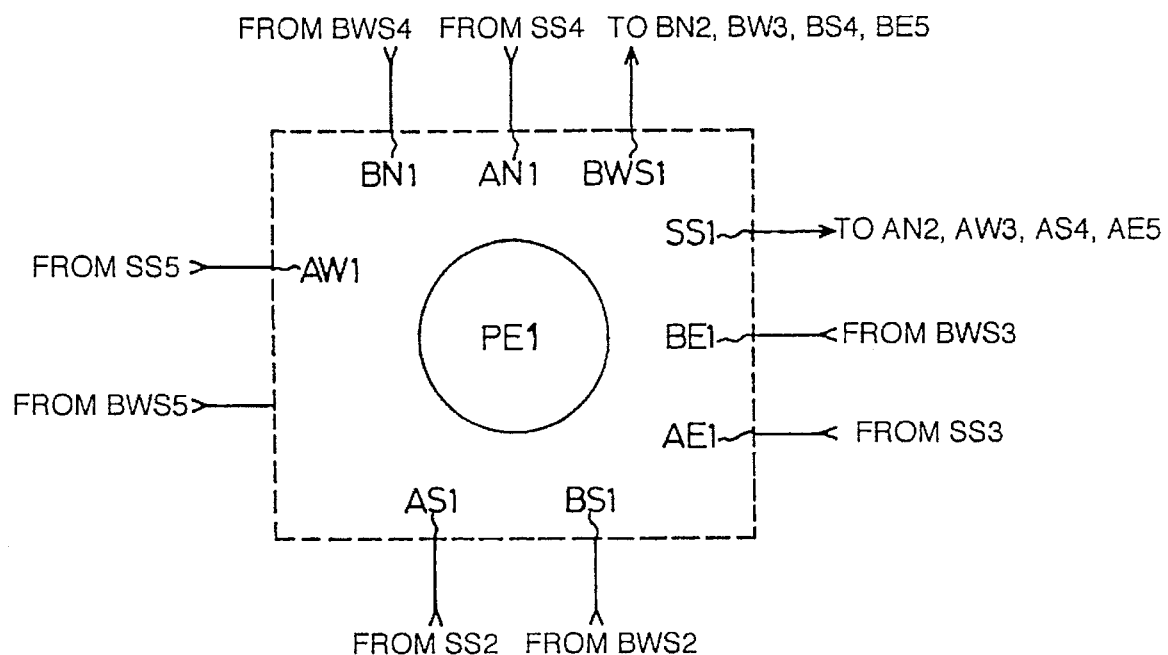
FIG. 3 illustrates diagrammatically the connection between the various computation units of the architecture.

The connection of the various ports is illustrated in FIG. 3. Thus, the ports BN1 and AN1 are connected to the ports BWS4 and SS4 whilst the ports BE1 and AE1 are connected respectively to the ports BWS3 and SS3, and the ports AS1 and BS1 are connected to the ports SS2 and BWS2 whilst the ports AW1 and BW1 are connected to the ports SS5 and BWS5. For all these ports, the direction of flow of the data is effected from the neighbouring processors to the processor PE1. The port SS1 is connected to the ports AN2, AW3, AS4 and AE5 and the port BWS1 is connected to the ports BN2, BW3, BS4 and BE5. Thus, it is possible to distribute to the corresponding processors on the one hand the value contained in the memory element BM1 and also a signal obtained from the signal WS1.

The operation of the various computation units of the architecture will now be described, limiting ourselves, for reasons of simplification in particular, to the interaction between the processor PE1 and the processor PE2.

During a new computation (new iteration) of the variable assigned thereto, the processor PE1 sends the read signal RI1 to the first memory means (in fact to the memory element Z1) and to the four memory means N1, E1, S1 and W1.

This signal RI1 is in the 1 state. On receiving this signal the transistor CMC1 is on whilst the transistor tc of the memory element Z1 is off thus allowing copying of the previous value of the variable contained in the element BM1 so that it may be taken into account by the processor PE1.

As regards the memory means E1, N1, S1, W1, it is assumed for the moment that none of the neighbouring processors is engaged in updating its respective variable. With this supposition, a logic "1" is present at the first input of the AND gate TN1. Since the read signal RI1 is in the 1 state, the output of the AND gate is in the 1 state thus turning on the transistor CN1 (switch closed) and turning off the transistor tc of the memory element N1 (switch open). Consequently, the value contained in the memory element BM4 of the processor PE4 can be written to the memory element N1 so as to be taken into account by the processor PE1. The operation is analogous for the elements E1, S1 and W1.

After determining the new value of the variable associated with the pixel P1, the processor PE1 generates an end-of-computation signal WS1 which permits the new computed value to be written to the master-slave flip-flop. After an interlude which is fixed with respect to this signal, the processor P1 can reinitialize the next computation analogously.

Let us now assume that the processor PE2, assigned to the pixel P2, which operates independently of the processor PE1, is attempting to read, by way of its memory means N2, the value of the variable contained in the memory element BM1 of the processor PE1 at the very moment at which this processor PE1 is updating this variable. In this case, the signal derived from the signal WS1 (in fact its complement after passing through the inverter I1), will act in regard to the processor PE2 like a signal for blocking this processor PE2 from taking into account the new value updated by the processor PE1. More precisely, the signal WS1 being in the 1 state, the "0" logic state is present at the first input of the logic gate TN2. Also, even if the signal RI2 is in the 1 state, the output of the AND gate is in the zero state, this turning off the transistor CN2 and turning on the transistor to of the memory element N2. Consequently, the new value which is being updated by the processor PE1 cannot be written to the memory element N2. Correspondingly, the processor PE2 then reads an available value which is the value stored in the storage loop of the memory element N2 and which corresponds to the old value stored in the memory element BM1 before updating.

The expert will therefore have appreciated that communication between the neighbouring elementary processors does not employ the enquiry/acknowledgment protocols conventionally used in normal asynchronous operations. According to the invention, a current elementary processor will be able to read the variables forwarded to it by a neighbouring processor (with the sole constraint that it must actually be available in the sense of the present invention as explained just above) at any moment, both with respect to the internal computation cycle of the neighbouring processor and also with respect to the generation of iteration which this neighbouring processor is in with respect to the current elementary processor.

Such pseudo-asynchronism of operation also makes it possible to obtain convergence of the algorithm even if the latter may be quasi-systematically modified in respect of the iteration generations since a processor will use the values delivered by the transfer means irrespective of the iteration levels to which these values correspond.

Figure 5:
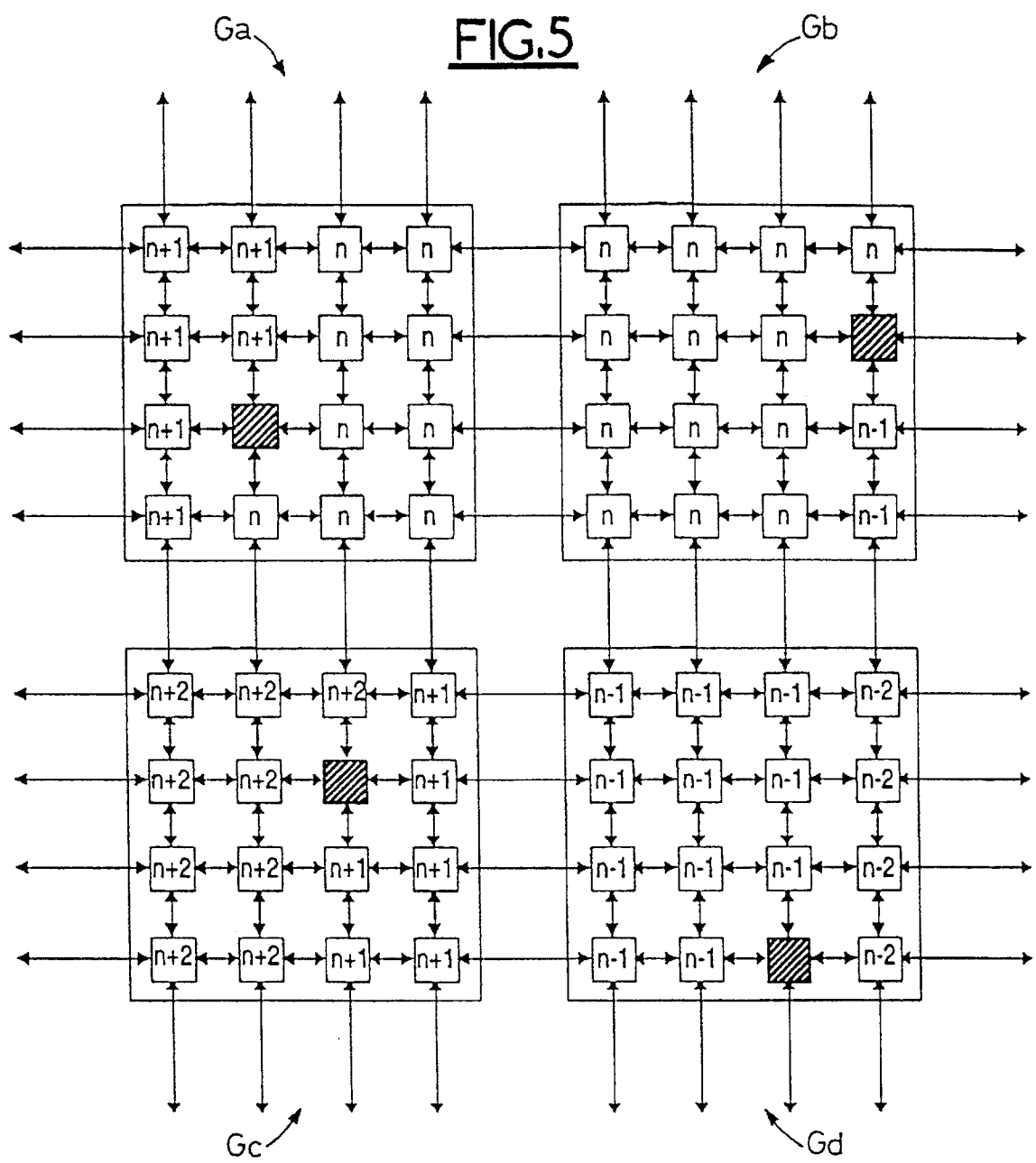
FIG. 5 illustrates another particular partitioning of the image allowing implementation of the invention according to locally sequential globally parallel operation, and, FIG. 6 illustrates very diagrammatically one embodiment of an architecture corresponding to the partitioning of FIG. 5.
Figure 6:
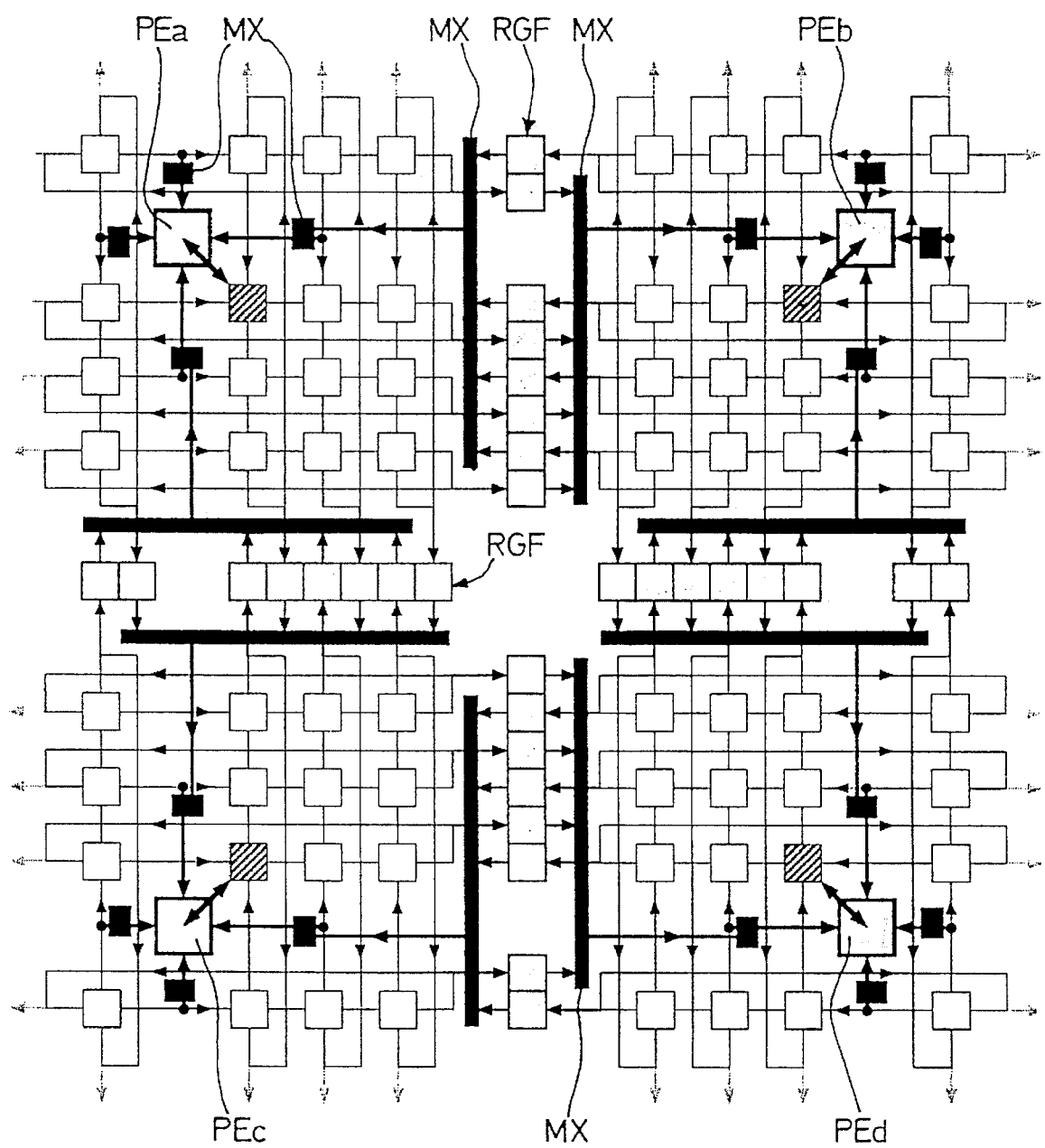

Although the invention readily lends itself to the assigning of one computation unit per pixel, since it is not necessary to provide high-performance processors of large dimension capable of handling conventional asynchronism, it may turn out in certain applications to be constraining to use such a partitioning. In this case, a partitioning of the image such as illustrated in FIG. 5 will then be adopted, which provides for an assigning of one computation unit per pixel group. In FIG. 5, each computation unit is assigned to a group of sixteen pixels. Although the various computation units also operate in parallel independently of one another, the computation of the successive values of the pixels of each group is undertaken sequentially in a predetermined order. In the present case, this order consists in sweeping the columns one after the other, beginning with the left-hand column in each group. The hatched pixel in this figure corresponds to the pixel which is being computed. It is appreciated moreover that the globally parallel and pseudo-asynchronous operation of the computation units may allow a processor, for example the one associated with the group Gc, to lead with respect to the other processors and anyway to take account, as regards the pixels situated on the edge of the group, of the values of the pixels situated on the edge of the neighbouring group, for example the group Gd, whose processor lags by two iterations with respect to the processor of group Gc.

Hardware-wise, the structure of each computation unit of a group is virtually analogous to that described with reference to FIG. 2. In fact, within each group, there is provision for as many registers as pixels and intended to contain the successive values of the variables assigned to these pixels. Depending on the location of the pixel in the group, the corresponding processor, for example the processor PEa, will use the value of the variable contained in the register assigned to this pixel as well as the values of the four neighbouring variables. A set of multiplexers MX is provided which makes it possible, during sequential operation within the group, to select the appropriate registers. The expert will have understood that when a processor is engaged in processing a pixel whose neighbours are not situated on one of the edges of the group, it is not necessary to provide means for blocking the reading of the registers of the neighbouring pixels since the processor can itself handle the reading from and writing to the various registers. The transfer means of the invention can then be summarized simply as the connections between the registers and the processor together with the means for sending the read control signals, which are internal to the processor. However, the problem mentioned of blocking during operation of the first embodiment of the invention with reference to FIG. 2, arises when a processor of a group is engaged in processing a pixel situated on an edge of the group, this requiring use of a neighbouring variable associated with a neighbouring pixel which is situated in another group handled by another processor, for example the processor PEb. In this case, a set of auxiliary registers RGF is advantageously provided, equipped with means of blocking such as AND logic gates and switching means analogous to those described with reference to FIG. 2, as well as with addressing means controlled by the processor's sequencing unit.

APPENDIX $$d_i^{k+1} = \frac{-E_i T(E_n + E_j d_j^k) + \sum_{(u,v) \in Nij} d_i^k(u,v)}{TE_i^2 + 5}$$

$$d_j^{k+1} = \frac{-E_j T(E_n + E_i d_i^k) + \sum_{(u,v) \in Nij} d_j^k(u,v)}{TE_j^2 + 5}$$

We claim:
1. A process for affecting a pseudo-asynchronism of operation between several computation units (PE1, PE2) which are together intended to evaluate in an iterative and cellular manner convergence values of a plurality of variables associated respectively with various points (P1–P5) of a predetermined grid (MA), each variable having to satisfy a prespecified iterative relation between itself and n neighboring variables associated with n neighboring grid points (P2–P5), wherein:
   a memory means (AM1, BM1, Z1) is assigned per point of the grid, intended to store successively all the values of the variable associated with this grid point (P1),
   the computation units are apportioned in such a way as to assign every grid point (P1) to a computation unit and two distinct computation units (PE1, PE2) to two chosen neighboring points (P1, P2) of the grid,
   all the computation units are made to operate in parallel and independently of one another,
   and for each current point of the grid,
   the computation unit assigned to this current point is made to compute each successive value of the variable associated with this current point on the basis of the value contained in the memory means assigned to the current point and of those available and arising from the memory means assigned to the points neighboring the current point, irrespective of iteration levels to which these available values correspond, and
   the said computation unit is made to store each new value thus computed in the memory means associated with the current point.

2. The process according to claim 1, wherein a first computation unit (PE1) blocks a second computation unit (PE2) from taking into account the said new value thus computed when the said first computation unit (PE1) is updating, with the new computed value, the memory means associated with the current point, the said second computation unit (PE2) then using an old value stored in the said memory means.

3. The process according to claim 2 wherein a distinct computation unit is assigned to each point of the grid.

4. The process according to claim 3, in which an image is gridded, wherein each point corresponds to one pixel of the image, the pre-specified relation corresponding to a particular processing of the image.

5. The process according to claim 2, wherein each computation unit (PEa, PEb, PEc, PEd) is assigned to a group of p points of the grid, and in that, within each group of points, the corresponding computation unit determines the successive values of each point of the group, sequentially in a predetermined order.

6. The process according to claim 5, in which an image is gridded, wherein each point corresponds to one pixel of the image, the pre-specified relation corresponding to a particular processing of the image.

7. The process according to claim 2, in which an image is gridded, wherein each point corresponds to one pixel of the image, the pre-specified relation corresponding to a particular processing of the image.

8. The process according to claim 1, wherein a distinct computation unit is assigned to each point of the grid.

9. The process according to claim 8, in which an image is gridded, wherein each point corresponds to one pixel of the image, the pre-specified relation corresponding to a particular processing of the image.

10. The process according to claim 1, wherein each computation unit (PEa, PEb, PEc, PEd) is assigned to a group of p points of the grid, and in that, within each group of points, the corresponding computation unit determines the successive values of each point of the group, sequentially in a predetermined order.

11. The process according to claim 10, in which an image is gridded, wherein each point corresponds to one pixel of the image, the pre-specified relation corresponding to a particular processing of the image.

12. The process according to claim 1, in which an image is gridded, wherein each point corresponds to one pixel of the image, the pre-specified relation corresponding to a particular processing of the image.

13. A pseudo-asynchronous parallel architecture of computation units, which are together intended to evaluate in an iterative and cellular manner convergence values of a plurality of variables associated respectively with various points (P1–P5) of a predetermined grid (MA), each variable having to satisfy a prespecified iterative relation between itself an n neighboring variables associated with n neighboring grid points (P2–P5), including an apportioning of the computation units assigning every point of the grid to a computation unit and two distinct computation units to at least two chosen neighboring points of the grid, and comprising:

a first memory means (AM1, BM1, Z1) associated with each current point (P1) of the grid, for successively storing all the values of the current variable of the current point, and capable of being connected to the computation unit (PE1) assigned to this current point (P1);

n transfer means (N1, E1, S1, W1) linked respectively to the first n memory means assigned to the n points neighboring each current point and capable of delivering respectively, to the computation unit assigned to the said current point, n available values derived from those contained in the first n memory means;

means for controlling the operation of each computation unit, which are capable of respectively making all the computation units operate in parallel and independently of one another; and processing means incorporated respectively in each computation unit, and capable respectively, on the basis of the value contained in the first memory means of the current point and of the values delivered by the n corresponding transfer means, irrespective of the iteration levels to which these delivered values correspond, of determining a new value for the variable associated with the current point, and of storing this new value in the said first memory means of the current point.

14. The architecture according to claim 13, wherein each computation unit is assigned to a group of p points of the grid, in that the processing means of each computation unit are capable of determining sequentially in a predetermined order the successive values of the points of each group, and in that the architecture comprises a set of multiplexers (MX) between the various memory means as well as intermediate registers (RGF) equipped with blocking means, arranged between the various groups.

15. The architecture according to claim 13, wherein a different computation unit is assigned to each point of the grid.

16. The architecture according to claim 13, wherein a first memory means includes a master-slave flip-flop controlled by the signal for control of writing (WS1) of the new computed value to this first memory means.

17. The architecture according to claim 16, wherein a different computation unit is assigned to each point of the grid.

18. The architecture according to claim 16, wherein each computation unit is assigned to a group of p points of the grid, in that the processing means of each computation unit are capable of determining sequentially in a predetermined order the successive values of the points of each group, and in that the architecture comprises a set of multiplexers (MX) between the various memory means as well as intermediate registers (RGF) equipped with blocking means, arranged between the various groups.

19. The architecture according to claim 13, wherein a transfer means (N2, CN2) linked to a first memory means (BM1) of a point (P1) of the grid to which a first computation unit (PE1) is assigned, and capable of delivering an available value derived from that contained in this first memory means (BM1) to a second computation unit (PE2) assigned to a neighboring point (P2) and distinct from the first, includes means for blocking (TN2) of the delivery of the value of the variable being updated by the first computation unit (PE1) in the first memory means (BM1), and in that the transfer means (N2) delivers to the second computation unit (PE2) the old value stored in the first memory means (BM1).

20. The architecture according to claim 19, wherein the means of blocking are controlled by a blocking signal generated by the first computation unit (PE1) and arising from the signal for control of writing (WS1) of the new computed value to the first memory means (BM1).

21. The architecture according to claim 19, wherein each computation unit is assigned to a group of p points of the grid, in that the processing means of each computation unit are capable of determining sequentially in a predetermined order the successive values of the points of each group, and in that the architecture comprises a set of multiplexers (MX) between the various memory means as well as intermediate registers (RGF) equipped with blocking means, arranged between the various groups.

22. The architecture according to claim 19, wherein a different computation unit is assigned to each point of the grid.

23. The architecture according to claim 19, wherein a first memory means includes a master-slave flip-flop controlled by the signal for control of writing (WS1) of the new computed value to this first memory means.

24. The architecture according to claim 23, wherein each computation unit is assigned to a group of p points of the grid, in that the processing means of each computation unit are capable of determining sequentially in a predetermined order the successive values of the points of each group, and in that the architecture comprises a set of multiplexers (MX) between the various memory means as well as intermediate registers (RGF) equipped with blocking means, arranged between the various groups.

25. The architecture according to claim 23, wherein a different computation unit is assigned to each point of the grid.

26. The architecture according to claim 20, wherein the transfer means includes a latch memory controlled by the signal for control of reading of the second computation unit and in that the blocking means include an AND logic gate receiving at input the read control signal and the blocking signal and connected at output to the latch memory.

27. The architecture according to claim 20, wherein each computation unit is assigned to a group of p points of the grid, in that the processing means of each computation unit are capable of determining sequentially in a predetermined order the successive values of the points of each group, and in that the architecture comprises a set of multiplexers (MX) between the various memory means as well as intermediate registers (RGF) equipped with blocking means, arranged between the various groups.

28. The architecture according to claim 20, wherein a different computation unit is assigned to each point of the grid.

29. The architecture according to claim 20, wherein a first memory means includes a master-slave flip-flop controlled by the signal for control of writing (WS1) of the new computed value to this first memory means.

30. The architecture according to claim 29, wherein each computation unit is assigned to a group of p points of the grid, in that the processing means of each computation unit are capable of determining sequentially in a predetermined order the successive values of the points of each group, and in that the architecture comprises a set of multiplexers (MX) between the various memory means as well as intermediate registers (RGF) equipped with blocking means, arranged between the various groups.

31. The architecture according to claim 29, wherein a different computation unit is assigned to each point of the grid.

32. The architecture according to claim 26, wherein a different computation unit is assigned to each point of the grid.

33. The architecture according to claim 26, wherein each computation unit is assigned to a group of p points of the grid, in that the processing means of each computation unit are capable of determining sequentially in a predetermined order the successive values of the points of each group, and in that the architecture comprises a set of multiplexers (MX) between the various memory means as well as intermediate registers (RGF) equipped with blocking means, arranged between the various groups.

34. The architecture according to claim 26, wherein a first memory means includes a master-slave flip-flop controlled by the signal for control of writing (WS1) of the new computed value to this first memory means.

35. The architecture according to claim 34, wherein a different computation unit is assigned to each point of the grid.

36. The architecture according to claim 34, wherein each computation unit is assigned to a group of p points of the grid, in that the processing means of each computation unit are capable of determining sequentially in a predetermined order the successive values of the points of each group, and in that the architecture comprises a set of multiplexers (MX) between the various memory means as well as intermediate registers (RGF) equipped with blocking means, arranged between the various groups.

* * * * *